United States Patent Office 3,197,338
Patented July 27, 1965

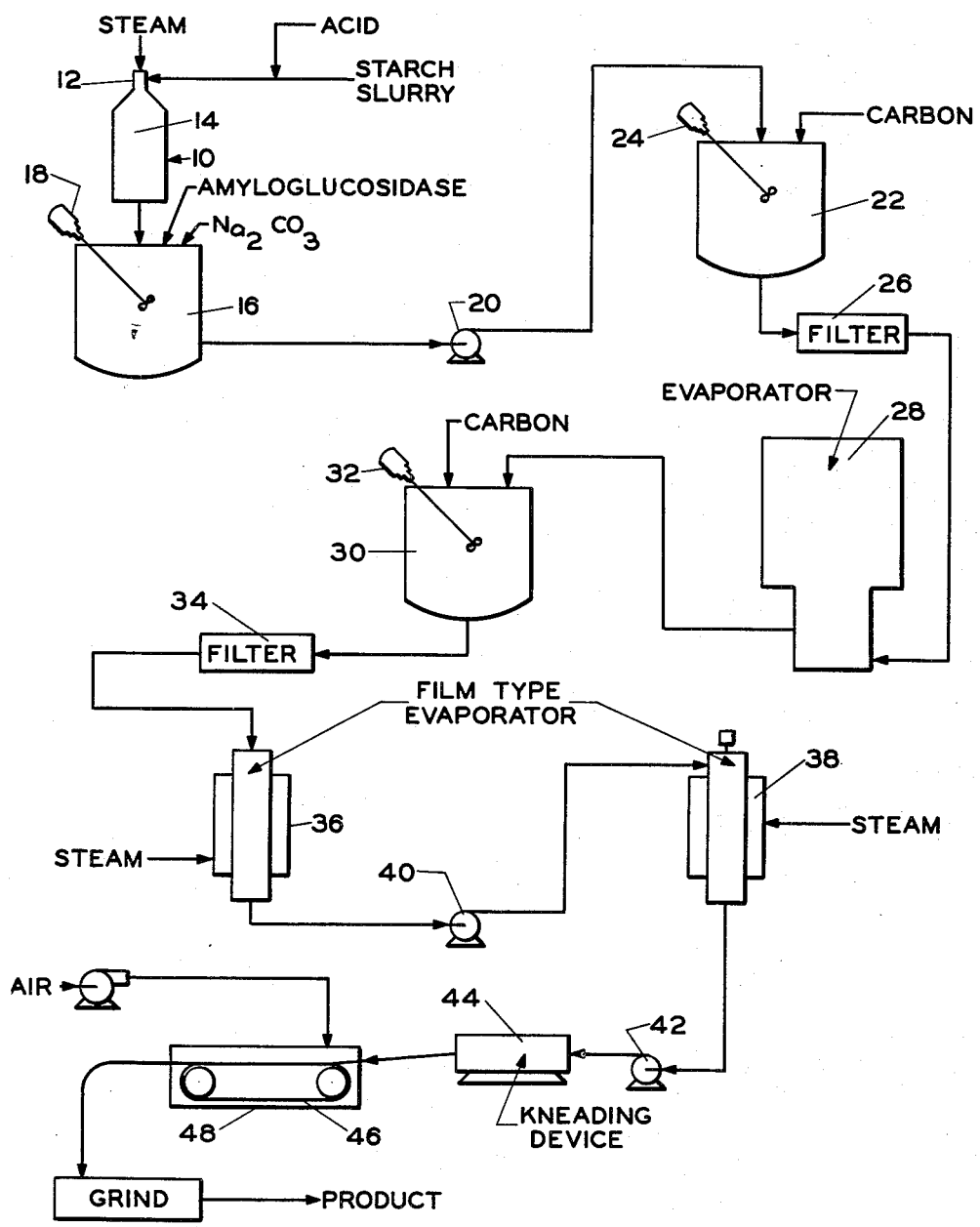

3,197,338
METHOD OF PRODUCING DRIED STARCH
CONVERSION PRODUCT
Thomas L. Hurst, Almerin Willard Turner, and Robert T. Gaudlitz, Decatur, Ill., assignors to A. E. Staley Manufacturing Company, Decatur, Ill., a corporation of Delaware
Filed June 21, 1962, Ser. No. 204,222
13 Claims. (Cl. 127—40)

This invention relates to the production of a stable dextrose product and particularly to a method of making a stable, high dextrose, starch-conversion product comparable for most purposes with crystalline dextrose hydrate.

In the manufacture of crystalline dextrose hydrate, even by the most modern methods, there is produced a carbohydrate by-product syrup. Although the amount of by-product syrup may be kept to a minimum by recycling or by taking an additional crop of dextrose from it, the penalty is always that the additional recovery is expensive, per unit recovered, especially in the refining necessary to maintain the quality of the product. Furthermore, the crystallization of dextrose hydrate is a relatively difficult, expensive, time-consuming operation, requiring several days for completion and a very large capital investment.

On the other hand, it has been proposed (Wilson et al. Patent 2,854,359) to make a dried, stable dextrose product from a starch hydrolyzate containing 5 to 15% non-dextrose carbohydrate, on a dry substance basis. In the process of this patent, a starch conversion liquor at around 38–40 Bé (70–75% solids) is sprayed upon a bed of preformed dextrose at an elevated temperature in a dryer and the combined conversion liquor and preformed dextrose are dried with hot air to a moisture content of less than 4%. In the dryer, the solid particles are continually cascaded to maintain intimate contact with the hot air which is fed to the dryer at temperatures in excess of 160° F. It is said that the product is semi-crystalline and that its high content of beta dextrose is stable on storage, giving a quick-dissolving product. A similar process is disclosed in Patent 2,369,231 to Harding.

Other attempts have also been made to prepare high-dextrose, dried starch conversion products. Patent Number 2,324,113 (Schopmeyer) discloses a method wherein a concentrated starch-conversion liquor is spray-dried to yield a quick-dissolving product, but this product is glassy and its storage characteristics are poor. In general, the glassy, dried syrups cake and are very hygroscopic. Patent Number 2,429,964 (Schopmeyer et al.) discloses still another method of making a dried, glassy dextrose product, in this case, by evaporating a starch conversion syrup by pumping it at high speed over very hot surfaces and discharging into a heated evacuated chamber. In these two patents, Numbers 2,324,113 and 2,429,964, no attempt is made to impart crystallinity to the product.

We have now developed a direct, economical method of preparing a dry, high-dextrose, highly crystalline starch-conversion product that is non-caking, stable on storage, quick-dissolving and capable of dissolving in water at 50% solids without crystallizing.

The object of the present method is, accordingly, to provide such a method whose operation is simple, direct and economical.

Another object is to provide a method of the type referred to wherein the concentration, drying and crystallization of a starch conversion liquor may be performed continuously.

Still another object is to provide a method of the type referred to wherein the product is of such high quality that it may be used, in many applications, in the place of crystalline dextrose hydrate.

Other objects are, in part apparent and, in part, pointed out hereinafter.

These objects are attained, in accordance with the method of this invention, by rapidly dehydrating a starch-conversion liquor having at least 55% solids and a dextrose content, dry solids basis, of at least 86, preferably 90, by flowing it in a film under vacuum at a temperature in the range of 130 to 285° F,. preferably 130 to 250° F., until the moisture content is reduced below 5% and the liquor is converted substantially to a melted solid, i.e. a molten dextrose glass, and then, preferably without cooling, vigorously kneading or working the molten dextrose glass in a confining chamber at a temperature in the range from 150 to 230° F. for 0.5 to 15 minutes to crystallize at least 45% of the dextrose present. The product is then quickly cooled, as by a current of air. The cooled product is then ground to size and packed and handled as if it were crystalline dextrose hydrate.

The process is illustrated in the accompanying drawing which is a diagrammatic flow sheet showing the principal steps of an embodiment of the present process.

Somewhat more specifically, the invention employs a starch conversion product derived by the conversion of a starch paste, thinned with acid or enzyme, by means of an amyloglucosidase enzyme prepartion. It has been found that direct acid conversion by the classical dextrose process is not satisfactory for obtaining the high dextrose content necessary for this process. At high solids necessary for commercial operations, the acid conversion yields at most around 85% dextrose on a dry substance basis. In addition, it requires substantial and expensive refining to produce a commercially desirable product. Further, the reversion products formed in the acid hydrolysis tend to inhibit crystallization of the dextrose. Accordingly, for this invention, the amyloglucosidase conversion is used.

In carrying out the conversion, an aqueous starch slurry of up to about 40% solids is initially pasted and thinned with a catalyst of the group consisting of strong mineral acids and starch-thinning enzymes. The initial thinning at a pH around 2 is terminated, when acid is used, at a D.E. (dextrose equivalent) in the range of 10 to 20. When enzyme is used for thinning, for example, an alpha amylase preparation of the commercially available types, the D.E. of the thinned starch may be somewhat higher, in the range of 10 to 35. The reason for the difference is that acid hydrolysis, when extended much beyond a D.E. of 20 produces reversion products that resist conversion to dextrose by the amyloglucosidase and interfere with the crystallization of the dextrose. The thinning step is carried out by heating the starch slurry, with the catalyst, for a relatively short interval in any efficient heat transfer apparatus. It is preferred to use the type in which steam is injected directly into the slurry. In the drawing, this step is illustrated with respect to the starch thinning device 10 which comprises a steam jet or eductor 12 into which the aqueous starch slurry containing the appropriate catalyst is fed. The steam and slurry are violently mixed in the jet and then passed into a hold tank 14 in which the pasted starch and catalyst are maintained at an elevated temperature in a relatively quiescent state until the desired D.E. is obtained. The thinned, pasted starch dispersion is withdrawn from the hold tank 14 to a conversion tank 16, equipped with an agitator 18. In operation, the starch slurry and steam are fed continuously and the thinned starch paste is withdrawn continuously, as described in the copending application of Etheridge, Serial No. 790,487, filed February 2, 1959, and now U.S. Patent 3,101,284.

Although the drawing shows the thinned starch paste as going directly to the enzyme converter 16, the drawing has been simplified, and there may be storage and mixing vessels, cooling equipment, filters and the like intervening. When enzyme is used for thinning, it may be desirable to have a separate heat exchanger or to sparge the paste with steam to inactivate the enzyme.

In the converter 16, the thinned starch paste, as shown, is partially neutralized, as with sodium carbonate or other suitable alkali, to the desired pH for enzyme conversion with amyloglucosidase. Typically, this will be a pH around 4, and generally between about 3.5 and 5. The amyloglucosidase preparation is added to the neutralized starch paste and the conversion is continued at an elevated temperature, usually 130 to 150° F., until the dextrose content, dry substance basis (D.) is preferably at least 90.

As is known, amyloglucosidase is an enzyme whose characteristic feature is that it converts starch directly to dextrose with little or no higher carbohydrate byproducts. Its action appears to be one of removing dextrose units, one by one, from the starch polymer. Any of the known amyloglucosidase preparations may be used for this invention, particularly after refining to remove transglucosylase, such as those disclosed in Patents 2,881,-115; 2,893,921; 3,012,944; 2,967,805; 2,970,086 and so on. Refined preparations of reduced transglucosylase content, such as those in the last two patents and in Hurst et al. applications Serial Numbers 86,349 (filed February 15, 1961) and 58,206 (filed September 26, 1960), may also be used and are, in fact, preferred. Also, such commercial amyloglucosidase preparations as Miles Laboratories' "Diazyme L" and Rohm and Haas' "Diastase 73" can also be used. The amount of amyloglucosidase used will depend on its potency and glucogenic activity in relation to the solids content and D.E. of the thinned starch paste.

The conversion is preferably continued, as stated, until the D. of the hydrolyzate is at least 90. This may require anywhere from 48 to 120 hours, depending on the starting dextrose, potency and amount of enzyme, pH, temperature and other factors that are known to the art. When the desired dextrose content is reached, the starch conversion liquor is pumped by a pump 20 to a tank 22 equipped with an agitator 24. Carbon is added as a refining agent, mixed with the conversion liquor and then removed, with impurities, upon passage through the filter 26, which may be a continuous precoat vacuum filter. The filtered conversion liquor is then flowed to a first evaporator 28 where a relatively small proportion of the water is removed and additional color bodies are developed in the liquor. Evaporator 28 may be of any desired kind; for example, it may be of the usual type used for concentrating starch conversion syrups. The slightly concentrated syrup (for example 30° Bé.) is then flowed to a second carbon-treatment tank 30 equipped with an agitator 32. Here, additional carbon is mixed with the conversion liquor for further refining. The carbon is removed when the liquor is flowed through a second filter 34 which can be of the same type as filter 26. It is to be understood that the refining techniques employed herein are those commonly used with starch conversion syrups. Although carbon refining is disclosed for purposes of illustration, other methods may also be used, such as resin refining, combinations of resin and carbon refining and combinations of bentonite and resin refining.

Up to this point, the starch conversion liquor has been prepared very much in the manner of starch conversion liquors for the production of crystalline dextrose hydrate. The steps now to be described include basic features of the present invention. One of these features is the vacuum evaporation of the refined syrup (at least 90 D.) to a water content of not more than 5%. In the specific embodiment of the invention to be described, this is carried out in two steps, primarily to take advantage of the operating characteristics of the final evaporator. In each of these steps of evaporation by the described method, the starch conversion liquor is flowed out in a film at a high velocity and under vacuum, and in the latter of the two steps the liquor is effectively dehydrated. The feed to these evaporation steps is a conversion liquor of up to 75% solids and this may be obtained with any of the commonly used evaporators for syrups. Preferably the solids content is not less than about 65%.

Although the evaporation is described as two steps beginning the first step in the range of 65 to 75%, it should be clearly understood that other methods can be used. For example, one possibility is to employ a single forced-circulation evaporator of the so-called "rising-falling-film" type for both steps of evaporation in a continuous process, whereby the feed is 65 to 75% solids and the evaporator product is at least 95% solids. Alternatively, it is possible to begin the vacuum evaporation below 65% solids, particularly in the range of 55 to 65% solids and continue to eventual dehydration at 95% or more solids content. Generally, this last alternative will not be preferred because it is more efficient to evaporate to 65 to 75% solids with the usual syrup evaporators and feed that product to one or more vacuum evaporators. Thus, although these steps are arbitrarily designated evaporation (to at least 85% solids) and dehydration (to at least 95% solids), they may, in practice, be part of a continuous operation in a single unit without separation of the intermediate concentrate. However, vacuum evaporation in a forced-circulation evaporator is desirable from 65–75% solids up, to prevent undue degradation of the product.

With reference now to the drawing, in the first step of evaporation according to the illustrated method, the syrup at a temperature in a range of 120 to 150° F. and 65 to 75% solids is pumped through the evaporator 36 in film form where it is concentrated under vacuum by heat exchange with steam to at least 85% and preferably to 90% solids. At the same time, the temperature of the syrup increases to the range of 190 to 220° F. This evaporator can be, typically, of the "falling-film" type.

The hot syrup is then pumped by means of a pump 40 to the second-stage evaporator or dehydrator 38, which is of the "wiped-film" type. In the wiped-film evaporator, a film of syrup is spread over the interior of an evacuated cylindrical chamber having a vertical axis, and a rotor carrying a plurality of blades rotates within the chamber whose wall carries the film of liquid. The blades, closely spaced from the chamber wall, impart rotational velocity to the liquid flowing down the wall and at the same time maintain a small film thickness which is less than 0.2 inch and preferably less than 0.1 inch. The wall of the chamber is heated, as with steam. The peripheral velocity of the blades is 15–50 feet per second, thereby introducing a high degree of turbulence in the film. The syrup is discharged at a temperature of 190 to 250° F., after retention in the vacuum chamber for a period of 0.1 to 0.5 minute, indicating that the axial component of the velocity of the film is relatively small. In this way, the balance of the water is rapidly removed from the syrup until the water content is not more than 5% and preferably less than 2%. The resultant product, which is at this point essentially anhydrous, is really a melted solid, and, if allowed to solidify, the solid is a glassy dextrose product of the type described before, as might be produced by the method of Schopmeyer et al. Patent Number 2,429,-964.

As described, the "wiped-film" evaporator employs a mechanical device to "wipe" the film of liquid. It is visualized that the wiping action imparts a very high velocity to the surface of the film and thereby produces highly turbulent flow in the film although the speed of the liquid through the device may be relatively slow. In a sense, the same kind of action is obtained in other film vacuum evaporators of the type called "falling-film" or "rising-falling-film." In these, the liquid is distributed as a film on the interior surfaces of a plurality of heat-exchange tubes which are heated by steam. As the liquid film flows toward the exit, evaporation takes place to produce large volumes of vapor. Accordingly, the velocity of the vapor relative to that of the film increases greatly until it is far in excess of that of the film, and the high-velocity vapor serves in this way essentially the same function as the rotor blades of the "wiped-film" evaporator. That is to say, the high-velocity vapor "wipes" the exposed surface of the film of viscous liquid, imparting to it a high velocity that induces a high degree of turbulence in the liquid.

With reference again to the drawing, the hot molten dextrose glass is pumped from the evaporator 38, by means of a pump 42, to a device 44 in which the hot molten glass is vigorously kneaded or worked in a confining chamber. Many devices to perform this function are available. Among them are the continuous mixers or blenders used in the rubber industry, dough mixers used in the baking industry, scraped surface heat exchangers, such as Votator, and so on. A preferred form of apparatus is the Ko-Kneader manufactured by the Baker-Perkins Company and described in U.S. Patent 2,505,125. In this device, there is a confining chamber and a cylindrical worm that rotates and reciprocates in the chamber, the worm having interrupted flights. The interior wall of the casing is provided with projections that register with the interruptions in the worm flights when the worm reciprocates. Kneading and mixing in this device is continuous. The device is also provided with a jacket and the worm has a hollow shaft, both of which permit the circulation of a heat transfer medium for cooling or heating. The product is discharged or extruded through a die-like orifice.

As indicated, the molten glassy dextrose product of the evaporator 38 is fed continuously to the kneading device 44. During the kneading, at least a part of the dextrose crystallizes and the kneading is continued until at least 45% of the dextrose has crystallized. The temperature and residence time in the kneading device must be carefully controlled to minimize heat damage to the product and yet to achieve the desired crystallinity. Temperatures in the range of 150 to 285° F. and preferably below 230° F. are used for a period of 0.5 minute to 25 minutes. A shorter time is used at higher temperatures and vice versa. Cooling will usually be required at the high temperatures because the crystallization of dextrose is exothermic and the heat must be removed. The product is continuously extruded at a temperature of 200 to 285° F., preferably below 230° F., from the nozzle of the kneader in a thin ribbon or strand which drops onto a moving belt in a chamber 48. Cooling air is blown into the chamber 48 by means of a blower 50 to cool the produce rapidly to a temperature below 150° F., to avoid degradation. The cooling may be carried out in two stages, using ambient air in the first stage and refrigerated air in the second. The cooled, readily frangible solid product is then ground to the desired size.

The temperature and time of kneading are, as noted, interrelated. The crystallization is more rapid at the higher temperatures in the range set forth. The reason seems to be that the viscosity is lower. It is to be noted that the lower viscosity also reduces the power requirements and it is therefore preferred to operate at a higher temperature. However, as the temperature is increased, heat degradation becomes more of a problem, especially in larger-capacity equipment in which the ratio of volume (or mass) to heat transfer surface is increased. Accordingly, the higher the temperature, the more difficult is the problem of controlling the extent of heat damage. Accordingly, the best range of operation, it has been found, is at temperatures below 230° F. and above about 170° F. for a period of 0.5 to 15 minutes.

The crystallization time is also effected by the dextrose content or D. of the molten glass. At a D. of about 86, the crystallization is relatively slow, perhaps being inhibited by the other carbohydrates present. However, as the D. incresases, there is a rapid increase in crystallization rate so that when the D. is 90 or more the rate of crystallization is sufficiently fast for all purposes even at the relatively low temperatures in the range mentioned above for crystallization.

It has been found that, in the process of concentrating the heavy syrup from 65% solids to form the the molten glass and working the molten glass, no seeding of the glass is necessary to obtain the desired crystallinity and storage stability. Apparently, after the syrup is concentrated to at least 95% solids, the vigorous agitation it undergoes in pumping and in the final kneading step produces sufficient seed inherently to cause the crystallization to occur during the working. In fact, it has been observed that the molten glass entering the pump 42 contains no visible seed but the molten glass entering the kneading device 44 does contain seed although nothing was added, and, therefore, the pump 42 is considered part of the kneading zone in the sense that it may perform some of the function of inducing and increasing crystallinity. While no seeding is necessary in the preferred process, it has been found that a small amount of seed, up to about 10% by volume may be used to advantage where the agitation and working are not as vigorous as that described. For example, in laboratory batch preparations using an ordinary laboratory vacuum evaporator and a heavy-duty batch-mixer, a small amount of seed is useful to reduce the time at the elevated temperature during working. Even when seeding is desirable, so long as the final dehydration and kneading or working of the dehydrated product are operated continuously, seed need only be introduced once and thereafter the process is self-seeding.

Upon discharge of the crystallized mass from the kneading device, it is cooled toward room temperature. It was noted that during cooling, the measured crystallinity increased 10 to 20% while cooling below 150° F.

It will be observed that once the concentrated, refined starch syrup is obtained from the amyloglucosidase conversion, the process may be carried out continuously and with minimum time in process. There is established an evaporation and dehydration zone and a kneading zone, and the syrup is flowed continuously through these zones in sequence. In the evaporation and dehydration zone water is rapidly and continuously removed from the syrup under vacuum to form the molten dextrose glass and not more than 5% water. This is done by continuous evaporating to at least 85% solids and then continuously dehydrating to at least 95% solids in the manner described. In the kneading zone, the molten dextrose glass is received and continuously kneaded or worked to induce crystallinity, and thereafter the product is continuously cooled. It has been estimated that to produce the dried dextrose product of this invention from a refined 70% solids syrup, less than 30 minutes is required in process to yield a cooled, ground and packed product.

In referring to starch, it should be understood that any of the varieties of starch may be used: cereal starch, such as corn, rice, sorghum and wheat; root starch, such as potato and tapioca; waxy starch, such as waxy corn and waxy sorghum; high-amylose corn starch; separated starch fractions, i.e., amylose and amylopectin. Similarly, starch that has been modified slightly as by oxidation or acid-hydrolysis may be used.

The acids used for thinning the starch slurry are those commonly employed for the purpose, i.e., strong mineral acids, such as hydrochloric, sulfuric and phosphoric acids. For enzyme thinning, one can use any of the commercial alpha amylase preparations, such as "Rhozyme H-39," "Mylase," and so on. These matters are not critical and are well understood in the art.

The water content of the product is critical as is the degree of crystallinity. As noted before, the water content of the feed to the kneading device must not be more than 5%. When the moisture content is relatively high within the range of 0 to 5%, the degree of crystallinity of the product should likewise be relatively high, i.e. the proportion of glassy solid should be relatively low. The reason for this is that the more of the dextrose glass present in the product, the more sensitive the product is to caking in the presence of water. Accordingly, to avoid all such difficulties, it is preferred to dehydrate to a moisture content of less than 2% and to have a product that is at least 70% crystalline.

The following examples illustrate the method of this invention, and it should be understood that the invention is not limited to the details disclosed.

In the examples following, reference to made to the crystallinity of the product. This is determined by selective extraction of the non-crystalline material. The extraction is performed by mulling a weighed sample of the product (10 grams) with forty milliliters of a saturated glycerolethanol (1 to 2) solution of anhydrous beta dextrose until a cream-like consistency is obtained. The creamy suspension of dextrose crystals is then filtered free of adhering liquid and washed with 2 to 5 ml. of the glycerol-alcohol solution. Finally, the separated crystals are washed with 5 ml. of ethanol saturated with anhydrous dextrose. The crystals recovered are dried and weighed and the ratio, expressed as a percentage, between the recovered crystals and the weight of the samples is the degree of crystallinity.

EXAMPLE I

An acid-thinned, filtered starch paste of 13.1 D.E., prepared as described above, was treated with an amyloglucosidase enzyme preparation at a pH of 4.0 and temperature of 140° F. for 66 hours using 7.5 units of amyloglucosidase per gram of starch. The solids content was around 30%. The D.E. was 94.5 and the D. was 90.5. The resulting syrup was refined and filtered twice, using 1% carbon each time, with intervening evaporation to about 70% solids. The 70% solids, 90.5 D. syrup was fed, at a temperature of 130° F., to a wiped-film evaporator whose rotor, ten inches in diameter, operated at 570 r.p.m. in a vacuum of 27–27.5 inches of mercury. The product, a molten dextrose glass, was discharged at a temperature of 190–198° F. and pumped at a temperature of about 206° F., on an average, to a Ko-Kneader device, as already described. Although the transfer was made immediately, the indicated temperature rise took place as a result of work done by the pump, of heat liberated as crystallization began in the pumped molten glass and of a small amount of heat added by the steam used to keep the pipe lines hot. The worm or screw of the kneading device was rotated at a speed of 44 r.p.m. Cooling water was circulated through the kneading device to maintain a relatively low temperature so that the average discharge temperature was about 170° F. The retention time in the kneading device was varied between 13.2 and 26.3 minutes to achieve product having a percentage crystallinity varying from 50.8 to 65.5. The product from the kneader was discharged and quickly cooled to a temperature under 100° F. The product was friable at all crystallinities produced and was readily ground to size. The solids content of the product was between 96.6 and 98.5%. A heat color value indicated that there was some degradation because of the extended retention time.

EXAMPLE II

A syrup having a D.E. of 95.5 and D. of 92.6 was prepared as described in Example I from an acid-thinned starch substrate at 11.4 D.E. This syrup, at a solids content of 70–71%, and temperature of 127–130° F. was fed to the same evaporator used in Example I, the evaporator operating at about 27.7 inches vacuum. The evaporator product was discharged at a solids content of 97.3 to 100% and temperature of 218 to 224° F. Without cooling, this product was pumped continuously to the kneader operating at 60 r.p.m. The retention time was varied during the run from 1.7 to 5.1 minutes and the product was discharged at temperatures of 213 to 234° F. The discharge from the kneader was immediately cooled below about 100° F., and was readily ground to size. The crystallinity of the various samples was 50.2 to 60.6%, and the product had satisfactory storage characteristics.

EXAMPLE III

The procedure of Examples I and II was repeated in all essential details starting with a 15.1 D.E. substrate to produce a molten dextrose glass of 96 D.E. and 93.6 D. with a solids content of 96.2–98.6 and at a temperature of 214 to 217° F. Without cooling, the molten glass was pumped to the kneader which was run, without cooling, at various speeds between 48 and 52 r.p.m. The worked product, at 56.4 to 63.7% crystallinity was discharged at 218 to 228° F. onto a moving belt where it was immediately cooled. Retention time in the kneader varied between 4.7 and 7.2 minutes. The product was readily ground to size and had satisfactory storage characteristics and very low heat color.

EXAMPLE IV

The procedure of Example I was repeated in all essential details starting with a substrate at 14.1 D.E. There was produced a molten dextrose glass of 97.2–100% solids and this was fed to the kneading device at a temperature of 214–220° F. with the device operating at 48 r.p.m. without cooling. The product was discharged at 220–228° F. at a retention time of 4.6–6.8 minutes. The crystallinity varied between 55.4–80% and had excellent storage characteristics after grinding.

EXAMPLE V

A filtered starch conversion liquid at 93 D.E., 89.6 D. was produced essentially as described before with a solids content of 57.2%. This syrup, at room temperature, was fed to the wiped-film evaporator, operated at 27.6 inches vacuum and at a lower throughput than in the previous examples so that the product was discharged at 206° F. with a solids content of 97.8. The hot molten dextrose glass was then fed to the kneading device, the kneading device operating at 60–65 r.p.m. No cooling was used in the kneading device and the product was discharged at about 250° F. after a retention time of 4.7–6.8 minutes. After cooling as described, the essentially dried product has a crystallinity of 70.4% and correspondingly good storage characteristics.

The storage characteristics of typical samples were determined by measuring the degree to which a predetermined volume packed when compressed at a fixed pressure and by estimating the ability of the compacted mass to flow freely. In the tests, a volume of 250 cc. of product was flowed into a graduate fitted with a weighted wood plunger designed to apply a pressure of 5.5 p.s.i. to the mass; this pressure being estimated to approximate warehouse storage in palleted bags. The graduates were maintained in a sealed container opened periodically only for examination. Typical results are set forth in Table 1.

All of the samples were slightly caked to about the same degree but could be broken easily to form a free-flowing powder.

*Table 1*

| | Dry Substance (Percent) | Crystallinity (Percent) | Time (Days) | Volume (cc.) |
| --- | --- | --- | --- | --- |
| Sample 1 | 97.6 | 67.2 | 70 | 232 |
| Sample 2 | 97.5 | 51.0 | 217 | 232 |
| Sample 3 | 97.5 | 49.5 | 217 | 234 |
| Dextrose[1] | 100 | 100 | 147 | 240 |

[1] Crystalline alpha dextrose hydrate (commercial "Cerelose").

Since many embodiments may be made of this inven-

We claim:

1. The method of making a dehydrated starch conversion product that comprises providing a concentrated aqueous starch conversion liquor having a dextrose content, dry substance basis of at least about 90%, evaporating water from and dehydrating said starch conversion liquor until the moisture content is less than 5% by heating it under vacuum under turbulent flow conditions in the range of 130 to 250° F. whereby a molten dextrose glass is formed, and kneading said molten glass and then rapidly cooling it below 150° F. to induce crystallization and to increase the crystallinity to at least about 45%, the kneading being performed in a confining chamber at a temperature in the range of 150 to 285° F. for a period of 0.5 to 25 minutes.

2. The method of making a dehydrated starch conversion product that comprises providing a concentrated aqueous starch conversion liquor having a dextrose content, dry substance basis, of at least about 90%, evaporating water from and dehydrating said starch conversion liquor until the moisture content is less than 5% by heating it under vacuum under turbulent flow conditions in the range of 130 to 250° F. whereby a molten dextrose glass is formed, and kneading the molten glass and then rapidly cooling it below 150° F. to induce crystallization of dextrose and to increase the crystallinity to at least about 45%, the kneading being performed in a confining chamber at a temperature in the range of 150 to 230° F. for a period of 0.5 to 15 minutes.

3. The method of claim 1 in which the starch conversion liquor is obtained by the amyloglucosidase-conversion of a thinned starch paste.

4. The method of claim 2 in which the starch conversion liquor is dehydrated to a moisture content of less than 2%.

5. The method of making a dehydrated starch conversion product that comprises preparing a concentrated aqueous starch conversion liquor having a dextrose content of at least 90%, dry substance basis, by the amyloglucosidase-conversion of a thinned starch paste, evaporating water from and dehydrating said starch conversion liquor until the moisture content is less than 5%, the final portion of water being removed by flowing the concentrated liquor out in a film under vacuum at a temperature in the range of 130 to 250° F., whereby a molten dextrose glass is formed, and kneading the molten glass and cooling it below 150° F. to induce crystallization of dextrose and to increase the crystallinity to at least 45%, the kneading being performed in a confining chamber at a temperature in the range of 150 to 230° F. for a period of up to 25 minutes.

6. The method of claim 4 in which the kneading is performed in the range of 170 to 230° F. for 0.5 to 15 minutes.

7. The method of making a dehydrated starch conversion product that comprises providing an aqueous starch conversion liquor having a dextrose content of at least 90%, dry substance basis, by the amyloglucosidase-conversion of a thinned starch paste, said conversion liquor having a solids content of at least 55%, evaporating said hydrolyzate until the solids content is at least about 85%, rapidly dehydrating the evaporated starch hydrolyzate by flowing it out in a film under vacuum at a temperature above about 130 and below about 250° F. until the moisture content is reduced below 5% and a molten dextrose glass is formed and kneading and then cooling said molten glass to induce crystallization of dextrose and to increase the crystallinity to at least 45%, the kneading being performed in a confining chamber at a temperature in the range of 150 to 230° F. for a period of 0.5 to 25 minutes.

8. The method of claim 6 in which the molten dextrose glass is mechanically pumped to said confining chamber.

9. The method of making a dehydrated starch conversion product that comprises providing a molten dextrose glass having a dextrose content, dry substance basis, of at least 90% and a water content of less than 5% at a temperature in the range of 130–250° F. and kneading the molten glass and cooling it below about 150° F. to induce crystallization of dextrose and to increase the crystallinity to at least about 45%, the kneading being performed in a confining chamber at a temperature in the range of 150 to 230° F. for a period of up to 25 minutes.

10. The method of claim 8 in which the dextrose content of the conversion liquor is at least 90% and the kneading time is not more than 15 minutes.

11. The method of making a dehydrated starch conversion product that comprises providing a molten dextrose glass having a dextrose content of at least 90%, dry substance basis and a water content of not more than 5% at a temperature in the range of 130 to 250° F., partially crystallizing said molten glass at a temperature in the range of 150 to 250° F. and then cooling it to below 150° F. to yield a product having a crystallinity of at least 45%.

12. The method of making a dehydrated starch conversion product that comprises continuously flowing a starch conversion liquor in sequence through a first zone of evaporation and dehydration under vacuum, a second zone of molten-solid working and a third zone of cooling, said starch conversion liquor having 65–75% solids when fed to said first zone and at least 90% dextrose, dry substance basis; in said first zone, dehydrating the liquor to at least 95% solids to form a molten dextrose glass at a temperature of 130 to 250° F; in said second zone, pumping the dehydrated liquor and working it at a temperature in the range of 150–230° F. and discharging it at a rate sufficient to retain the product in said second zone for 0.5 to 15 minutes to induce crystallization of dextrose and to increase the crystallinity to at least about 45% and flowing the partially crystallized product, while still fluid, to said third zone; in said third zone receiving the fluid product of the second zone and cooling it to a temperature below 150° F.

13. The method of making dehydrated starch conversion product that comprises providing a concentrated aqueous starch conversion liquor having a dextrose content, dry substance basis, of at least about 90%, evaporating and dehydrating said starch conversion liquor until the moisture content is less than 5% by heating it under vacuum under turbulent flow conditions in the range of 130–250° F. whereby a molten dextrose glass is formed, seeding the said molten dextrose glass, and kneading said molten glass and then rapidly cooling it below 150° F. to induce crystallization and to increase the crystallinity to at least about 45%, the kneading being performed in a confining chamber at a temperature in the range of 150–285° F. for a period of not more than 25 minutes.

References Cited by the Examiner

UNITED STATES PATENTS

| | | | |
|---|---|---|---|
| 1,890,913 | 12/32 | Newkirk | 127—61 |
| 1,976,361 | 10/34 | Newkirk | 127—61 |
| 2,065,724 | 12/36 | Newkirk | 127—61 |
| 2,150,197 | 3/39 | Wagner et al. | 127—58 |
| 2,305,168 | 12/42 | Langlois | 127—38 |
| 2,347,288 | 4/44 | Schlegel et al. | 127—15 |

FOREIGN PATENTS 538,568  8/41  Great Britain.

MORRIS O. WOLK, *Primary Examiner.*